United States Patent [19]
Georgens et al.

[11] Patent Number: 5,803,008
[45] Date of Patent: Sep. 8, 1998

[54] SYSTEM AND METHOD FOR MONITORING AND CONTROLLING ANCHOR RODE LENGTH

[75] Inventors: Harold H. Georgens, San Diego; David H. Georgens, Cardiff; James A. Eggebeen, Temecula, all of Calif.

[73] Assignee: Georgens Industries, Inc., San Diego, Calif.

[21] Appl. No.: 877,350

[22] Filed: Jun. 17, 1997

[51] Int. Cl.⁶ ........................................ B63B 21/24
[52] U.S. Cl. .............................................. 114/293
[58] Field of Search ................... 114/293, 294, 114/144 R, 144 E, 230; 441/3–5

[56] References Cited

U.S. PATENT DOCUMENTS

| | | |
|---|---|---|
| 3,068,828 | 12/1962 | Ellis . |
| 3,352,017 | 11/1967 | Newberg . |
| 3,948,201 | 4/1976 | Takeda et al. ........................... 114/23 |
| 3,977,448 | 8/1976 | Botting . |
| 4,109,479 | 8/1978 | Godeau . |
| 4,191,340 | 3/1980 | Kubanek . |
| 4,238,824 | 12/1980 | DeMatte . |
| 4,438,391 | 3/1984 | Rog et al. . |
| 4,620,371 | 11/1986 | Murakami . |
| 4,634,072 | 1/1987 | Stealy . |
| 4,651,139 | 3/1987 | Oettli . |
| 4,697,758 | 10/1987 | Hirose et al. . |
| 4,856,450 | 8/1989 | Lubahn . |
| 4,874,140 | 10/1989 | Hitomi . |
| 4,912,464 | 3/1990 | Bachman ................................ 114/293 |
| 5,007,029 | 4/1991 | Scott ..................................... 114/293 |
| 5,236,147 | 8/1993 | Kaneko . |
| 5,395,065 | 3/1995 | Hirose . |
| 5,427,323 | 6/1995 | Kaneko et al. . |
| 5,445,103 | 8/1995 | Bleth et al. . |

OTHER PUBLICATIONS

Quick Meter–Counter for Anchoring, Technical Handbook n.1, Marina DiRavenna (RA) –Italia, pp. 1–40, undated.

Primary Examiner—Stephen Avila
Attorney, Agent, or Firm—Michael H. Jester

[57] ABSTRACT

A system for monitoring and controlling the length of anchor rode comprises a winch, a sensor assembly associated with the winch and a control circuit connected to the sensor and the winch. The winch is mounted on a vessel and has a rotatable element about which a length of anchor rode is at least partially wrapped. The sensor assembly is mounted adjacent the rotatable element for generating signals representative of the amount and direction of rotation of the rotatable element. The winch is controllable to rotate the rotatable element in a first direction, either in a powered fashion or through free fall, for letting out the anchor rode from the vessel to lower the anchor. The winch is also controllable to rotate the rotatable element in a second direction for pulling the anchor rode into the vessel to raise the anchor. The control circuit is connected to the winch for causing the rotatable element to rotate in the first and second directions and is also connected to the sensor assembly for determining a length and direction of anchor rode deployed from the winch utilizing the signals from the sensor assembly.

16 Claims, 15 Drawing Sheets

SYSTEM AND METHOD FOR MONITORING AND CONTROLLING ANCHOR RODE LENGTH

BACKGROUND OF THE INVENTION

The present invention relates to raising and lowering marine anchors, and more particularly, to a system and method for electronically monitoring and controlling the length of anchor rode.

For centuries boats and ships have utilized anchors. In general an anchor is a device designed to engage the bottom of a sea, lake or waterway and through its resistance to drag maintain a vessel within a predetermined radius. All of the line, taken collectively, that lies between a vessel and her anchor is commonly called "rode", whether it be natural fiber (e.g. hemp) synthetic fiber (e.g. Nylon), chain, wire, or combinations of the same. In smaller vessels, the anchor rode is typically made of fiber line. A short length of chain may connect the anchor to the fiber line for weighing down the shank of the anchor to orient it correctly relative to the bottom. In larger vessels, the anchor is attached solely with chain, i.e. no fiber line is utilized. Most vessels have bow chocks which are fittings usually on the rail of the bow of a vessel which serve as fairleads for the anchor rode. Many larger vessels have a hawspipe which is a cylindrical or elliptical pipe or casting mounted in a vessel's foredeck through which anchor rode runs from a locker. In ships, the anchor rode typically enters the vessel through a hawse hole in the upper portion of the hull forming the bow.

In reference to anchoring, the term "scope" is used to define the ratio of the length of the anchor rode to the vertical distance from the bow chocks to the bottom (i.e. water depth plus height of bow chocks above the water). In the nautical field, the term "ground tackle" generally refers to the anchor, rodes, fittings, sentinels, buoys, etc. used to secure a vessel at anchor.

An anchor must be properly set if it is to yield its full holding power. Typically the anchor is first lowered to the bottom and the vessel is backed down slowly as anchor rode is played out. When a predetermined desired scope has been achieved, the anchor rode is quickly snubbed so that the anchor bites into the bottom. By way of example, a lightweight burial type anchor, such as a Danforth anchor having a pair of sharp flukes, may be set in a soft bottom with a scope as low as two or three. Anchors such as a kedge or grapnel set better with a scope of five to eight.

An anchor should not be lowered when the vessel has any headway. The bow of the vessel should be brought up slowly to the spot where the anchor is to lie. As the vessel begins to gather sternway, via power, tide, and/or wind, the anchor is lowered over the side. In smaller vessels the anchor is typically deployed by hand and the sailor or power boatman feels when the anchor has touched bottom. However, in larger vessels, a powered winch is used to lower or raise the anchor because of the considerable weight of the anchor and its chain rode. Therefore it is not possible to feel when the anchor has bit bottom by sense of touch.

Various techniques have been developed over decades to mark an anchor rode for readily determining scope. Fiber anchor rode typically used with small vessels may have colored markings woven into the same. Plastic cable markers are commercially available in sets to mark various lengths and are attached to fiber rode by inserting them between strands. Markings may be painted on the chain, for example, at ten foot, twenty-five foot, or fifty foot intervals. However, such markings readily wear off. In daylight such painted markings are functional, but in the dark, traditional markers of strips of leather, bits of cotton or flannel cloth, and pieces of marlin with knots have the advantage of being able to be read by feel, although this is very inconvenient and can easily lead to errors. Furthermore, in some yachts the anchor may be dropped from the pilot house by electrical command and the captain or helmsman has considerable difficulty judging from a remote location the amount of anchor rode that has deployed from the winch. The chain rode may pile up on the bottom and temporarily hold the vessel fast. If the wind or seas later come up, the pile of chain rode will unravel and the vessel will drift downwind. This can result in grounding or collisions with other vessels, pilings, piers, rocks, reefs, and other obstructions.

SUMMARY OF THE INVENTION

It is therefore the primary object of the present invention to provide a system and method for monitoring and controlling the length of anchor rode.

According to the present invention a system for monitoring and controlling the length of anchor rode comprises a winch, a sensor assembly associated with the winch and a control circuit connected to the sensor assembly and the winch. The winch is mounted on a vessel and has a rotatable element about which a length of anchor rode is at least partially wrapped. The sensor assembly is mounted adjacent the rotatable element for generating signals representative of the amount of rotation of the rotatable element. The winch is controllable to rotate the rotatable element in a first direction, either in a powered fashion or through free fall, for letting out the anchor rode from the vessel to lower the anchor. The winch is also controllable to rotate the rotatable element in a second direction for pulling the anchor rode into the vessel to raise the anchor. The control circuit is connected to the winch for causing the rotatable element to rotate in the first and second directions and is also connected to the sensor assembly for determining a length of anchor rode deployed from the winch utilizing the signals from the sensor assembly.

DESCRIPTION OF THE PREFERRED EMBODIMENT

Figure 1:
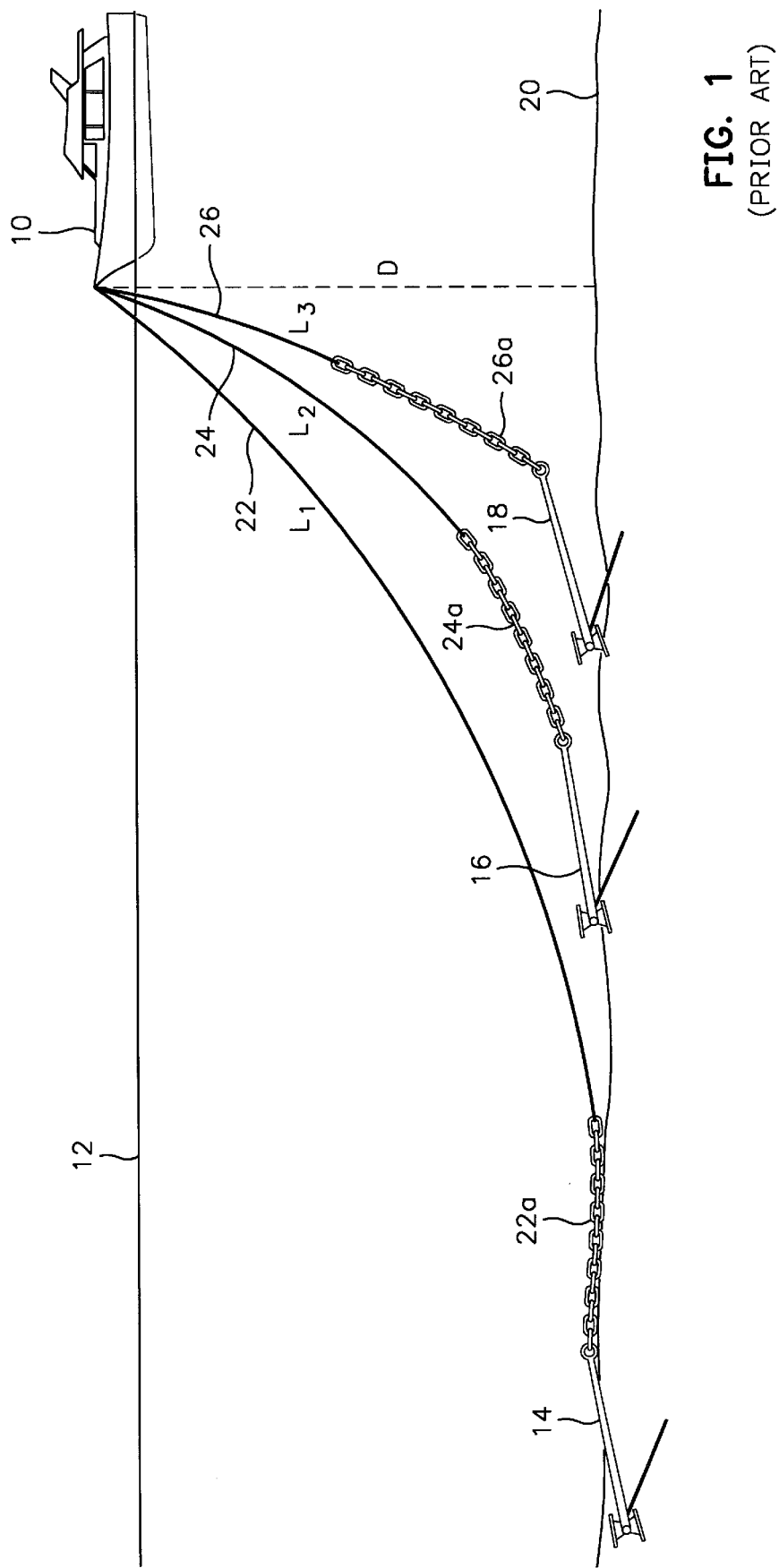
FIG. 1 is a diagrammatic illustration of a vessel anchored with several different scopes. The size of the anchors and the lengths of the anchor chains have been exaggerated in this figure.

Referring to FIG. 1, a vessel 10 is shown afloat on the surface 12 of the ocean with several different Danforth anchors 14, 16 and 18 lying on the bottom 20 and connected to the bow of the vessel with different length anchor rodes 22, 24, and 26, respectively. The anchor rodes in FIG. 1 are made of fiber line attached to the anchors with short segments 22a, 24a and 26a of chain. The anchor rodes 22, 24 and 26 have progressive lengths L1, L2 and L3, respectively.

The purpose of this diagram is to illustrate three alternate anchoring configurations having three different scopes. They enable a better understanding of why it is very important for the sailor or power boatman to know the length of anchor rode. vertical distance labeled D in FIG. 1 is the depth measured from the bottom 20 plus the height of the bow chocks above the surface 12 of the ocean. The scope is thus the ratio of rode length L1, L2 or L3 to D. The scope is critically important to safe anchoring. The anchor 18 is deployed with a scope of approximately two, i.e. the length L3 is about twice the distance D. The angle of pull on the anchor 18 tends to pull the anchor free. The anchor 16 is deployed with a scope of approximately four. The anchor 16 can dig into the bottom 20, but there is still too much upward pull on the rode 24. The anchor 14 is deployed with a scope of approximately eight. The short length of chain 22a lies flat on the bottom 20, and any pull on the rode 22 causes the anchor 14 to dig in deeper into the bottom 20. Thus it is apparent that the scope of eight is preferable to the scope of four or two in the illustrated example.

In the example of FIG. 1, the boatman can readily estimate the distance D either from a depth chart or from a fathometer reading. However it is difficult to accurately determine the rode length, particularly where the rode is made entirely of chain, as discussed in the background above.

Larger vessels typically utilize powered winches to raise and lower an anchor. These winches may be used with fiber, cable or chain rodes. They have an electric motor powered by an onboard source of electric power which drives a rotatable element. The powered winches may also have hydraulic motors powered by an onboard source of pressurized hydraulic fluid. There are two basic types of winches used to let out and draw the anchor rode. These are a windlass type winch and a drum type winch. A windlass does not accumulate rode, but instead feeds it to a storage locker or other compartment. Its rotatable element may be a capstan, a gypsy, or a combination of a capstan and a gypsy. These rotatable elements may rotate about a horizontal axis or a vertical axis. A capstan has a smooth or rough surface and is used with line, but not chain. A gypsy is a toothed mechanism typically used with chain, or a combination of line and chain. The drum type winch has a drum that rotates about a horizontal axis only. The anchor rode is accumulated around the drum in this type of winch.

Some winches positively pull the rode into the vessel and positively let the rode out of the vessel at a more or less uniform rate which is determined by the power driving of the capstan, gypsy or drum. In other winches, the rotatable element can spin freely when released, thereby allowing the anchor and its rode to free fall. For the sake of expediency, the term "winch" as used hereafter shall encompass all of the foregoing configurations and the term "rotatable element" shall encompass a capstan, a gypsy, a drum and similar mechanisms. The winch could be "energizable" to rotate the rotatable element to let out the rode either by powered driving of the rotatable element or release of the same to allow it to spin freely. The winch could be energizable to rotate the rotatable element in a second direction to draw in the anchor rode.

Figure 2:
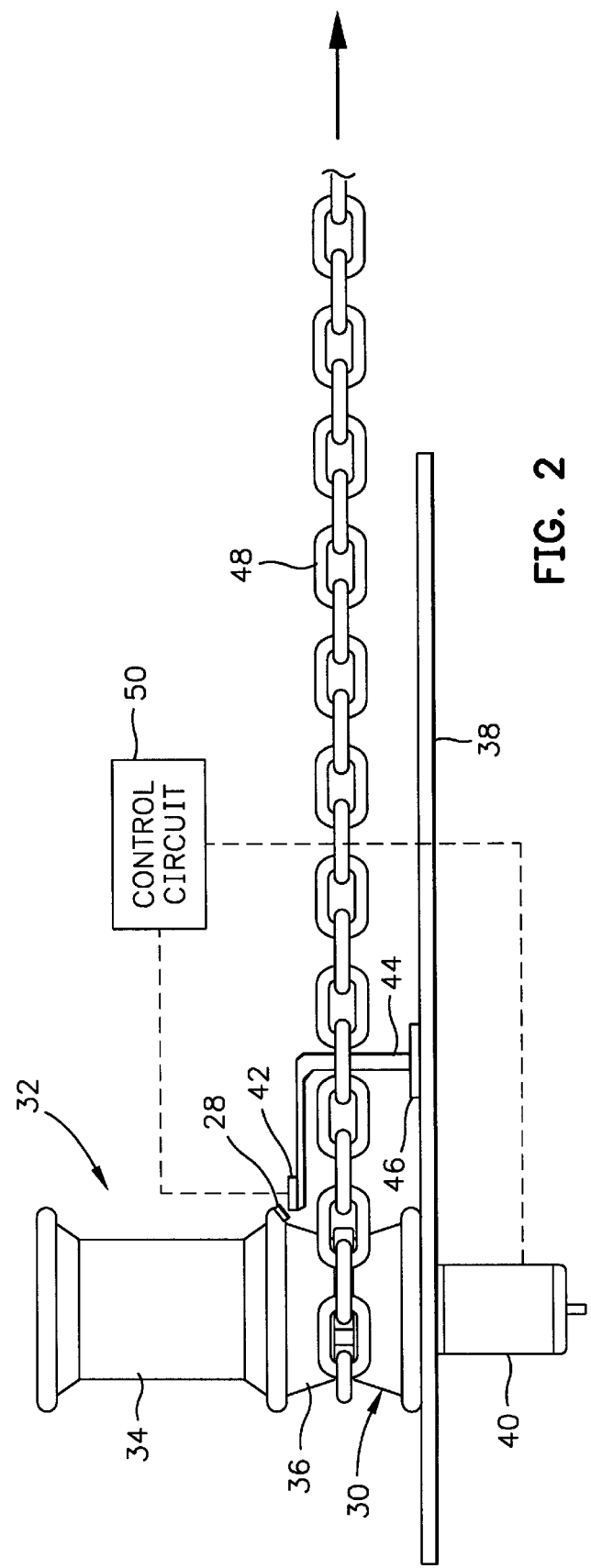
FIG. 2 is a diagrammatic illustration of a windlass type winch illustrating the relative locations of a magnet mounted to its gypsy and a sensor assembly which detects the amount and direction of rotation of the gypsy in accordance with a preferred embodiment of our invention.

Referring to FIG. 2, in accordance with a preferred embodiment of the present invention a magnet 28 is glued or otherwise affixed to the rotatable element 30 of a winch 32. The winch 32 is a capstan and gypsy type winch in which the rotatable element 30 includes a capstan 34 and a tapered gypsy 36 that both rotate around a vertical axis. The winch 32 is mounted on top of the deck 38 of the vessel. The winch 32 further includes an electric motor 40 and a gear reduction mechanism (not illustrated) mounted below the deck 38 for driving the capstan 34 and gypsy 36. A sensor assembly 42 is mounted adjacent the gypsy 36 near the periphery thereof where the magnet 28 is secured for sensing each rotation of the gypsy 36. The sensor assembly 42 preferably has two reed switches mounted side-by-side. The first reed switch is activated the other one and this information is used to determine the direction of rotation. The sensor assembly 42 generates signals representative of both the amount and direction of rotation of the gypsy 36. The sensor assembly 42 is mounted on one end of an L-shaped bracket 44 whose lower end is rigidly connected to a base 46 secured to the deck 38 of the vessel. A chain anchor rode 48 partially wraps around the gypsy 36. A control circuit 50 actuates the existing motor control circuit 33 (FIG. 3) connected to the motor 40 for letting out and drawing in the chain anchor rode 48.

A single reed switch could be utilized in the sensor assembly 42. However, this would lead to an inability to detect the direction of rotation of the rotatable element of the winch 32. In such a configuration, the boatman could let out a given length of anchor rode, and then draw in a certain amount of anchor rode, and the system would add to the count, instead of subtracting from the same. By utilizing a pair of reed switches in the sensor assembly 42, it is possible to not only detect the amount of anchor rode deployed, but also the direction of rotation of the winch which permits the control circuit 50 to determine whether anchor rode is being let out or drawn in. The control circuit 50 determines which of the adjacent reed switches is actuated first, and in this fashion, determines the direction of rotation.

In accordance with our invention, the system of FIG. 2 accurately counts and displays the length, in feet or meters, of rode as the winch 32 lower or raises the anchor. This enables the boatman to calculate scope accurately, and eliminates the guesswork involved when typical rode markings wear out, or when the boatman anchors his vessel at night or in foul weather. The control circuit 50 includes the capability for remotely controlling the winch 32, for example, from the pilot house of the vessel, and at the same time monitoring the anchor rode length from such a remote location. While in FIG. 2 we have illustrated the winch as a windlass type winch including both a capstan and a gypsy, our system will work equally well with various other winches of the types described previously.

The measurement of the number of feet or meters of anchor rode that has passed the sensor assembly 42 is referred to herein as the count. The control circuit 50 provides a continuous display of the count and the direction the rode is traveling. The control circuit 50 also allows the motor 40 of the winch 32 to be controlled from the same remote location where the count and direction of travel of the anchor rode are being monitored. As explained hereafter, the control circuit 50 has an internal battery backup that maintains the count in a sleep mode in case the main power for the control circuit 50 fails or if the power cord of the control circuit is unplugged. When the control circuit is operating on battery power, the count is maintained for at least ninety (90) days, and can be viewed at the press of a button. The control circuit 50 may be mounted in a stationary panel type unit in the pilot house. It includes a display and both pushbutton and toggle switches, and in addition, the capability for receiving a portable handheld control unit (not shown) which is attached to the stationary unit through a socket (not shown). The socket can be installed into the deck 38 adjacent the winch 32 so that the lowering and raising of the anchor can be visually observed as the count is being monitored. The handheld control unit has the identical circuitry as the panel type unit.

Where the motor control circuit 33 (FIG. 3) of the winch 32 draws more than one ampere of current, a relay board 52 must be connected between the motor control circuit 33 and the control circuit 50. The relay board 52 accommodates higher current flows, such as fifteen ampers, using, for example, twelve volt coils. Relay boards with higher current ratings and higher coil voltages may be utilized to fulfill particular requirements.

Where our invention utilizes a windlass type anchor winch, our system accurately counts anchor rode by sensing the rotation of either the capstan or the gypsy, whose circumference is pre-set into the control circuit 50. When the windlass has both a capstan and a gypsy, the system can only be configured to sense the rotation of one of these elements, whose circumference measurement must be pre-set into the control circuit 50. A free-fall type of windlass can also be utilized with our system as long as the anchor rode rotates the capstan or the gypsy during free-fall.

The control circuit 50 includes a microcontroller 54 which may be, for example, a Phillips/Signetics SC 87C51CCF40 or an INTEL D87C51 programmable erasable integrated circuit, or one-time programmable equivalent. The microcontroller 54 includes an onboard CPU 56, an onboard RAM 58 and an onboard ROM 60. The microcontroller 54 further includes input ports 62 and 64 as well as output ports 66 and interrupts 68. The microcontroller 54 also includes an onboard reset circuit 70, an onboard clock 72 and an onboard power circuit 74. The output port 66 drives an LCD display 76, preferably with backlight capability.

By way of example, the LCD display 76 may be a VIKAY VK4002L component. The backlight on the display 76 may be controlled through a manual ON/OFF switch 78 preferably of the pushbutton type. The display 76 may be manually actuated through an ON/OFF switch 80 also preferably of the pushbutton type.

A manually actuatable count reset switch 82, also preferably of the pushbutton type is connected to the interrupts 68 and to an input/output connector 84. The signals from the reed switches of the sensor assembly 42 are fed through the input/output connector 84 and then through an opto-isolator circuit 86 to the input ports 62 of the microcontroller 54. A manually actuable anchor up-down switch 88, preferably of the toggle type, is connected through the input/output connector 84 to existing motor control circuit 33.

The control circuit 50 has jumper connections 90 which can be set so that the control circuit 50 will display anchor rode in either English units (feet) or Metric units (meters). The control circuit 50 also has a four-position DIP switch 92 for programming the distance-between-sensor-pulses which is derived from an accurate measurement of the working circumference of the rotatable element of the winch being utilized, i.e. the capstan or gypsy in the case of a windlass-type winch or the drum circumference in the case of a drum-type winch.

DC power (ten to thirty-five volts) is applied to the control circuit 50 through the input/output connector 84. This power is supplied from the input/output connector 84 to a voltage regulator circuit 94. The voltage regulator circuit is in turn connected to a sleep mode circuit 96 which connects to the interrupts 68 of the microcontroller 54. The voltage regulator 94 supplies power to the power circuit 74 of the microcontroller 54. The voltage regulator also supplies power to a battery charge circuit 98 which in turn supplies a trickle charge to a rechargeable backup battery 100. The battery 100 is connected to the power circuit 74 of the microcontroller 54 for maintaining the anchor count in the event of a failure, disconnection or other interruption of the main DC power supplied to the input/output connector 84.

The clock 72 of the microcontroller 54 is driven by an external oscillator circuit 102. A power-up circuit 104 is connected to the hardware reset circuit 70 of the microcontroller 54. The count reset commands, initialed by the reset switch 82 and fed into the interrupts 68, are also transferred between the control circuit 50 and other control circuits, e.g. of a hand held control unit, through the input/output connector 84.

Figure 3:
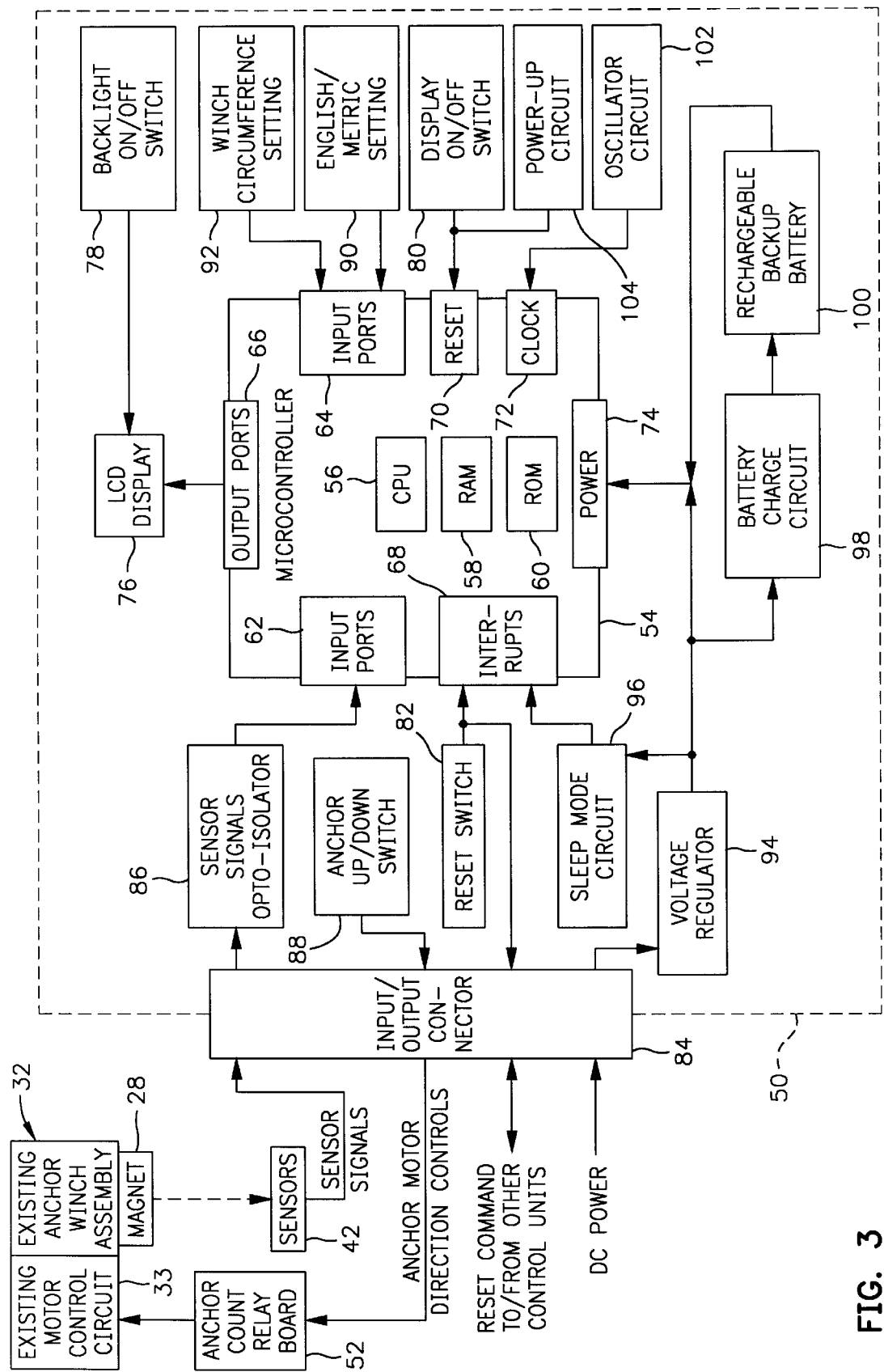
FIG. 3 is a functional block diagram of the control circuit of the preferred embodiment.
Figure 4A:
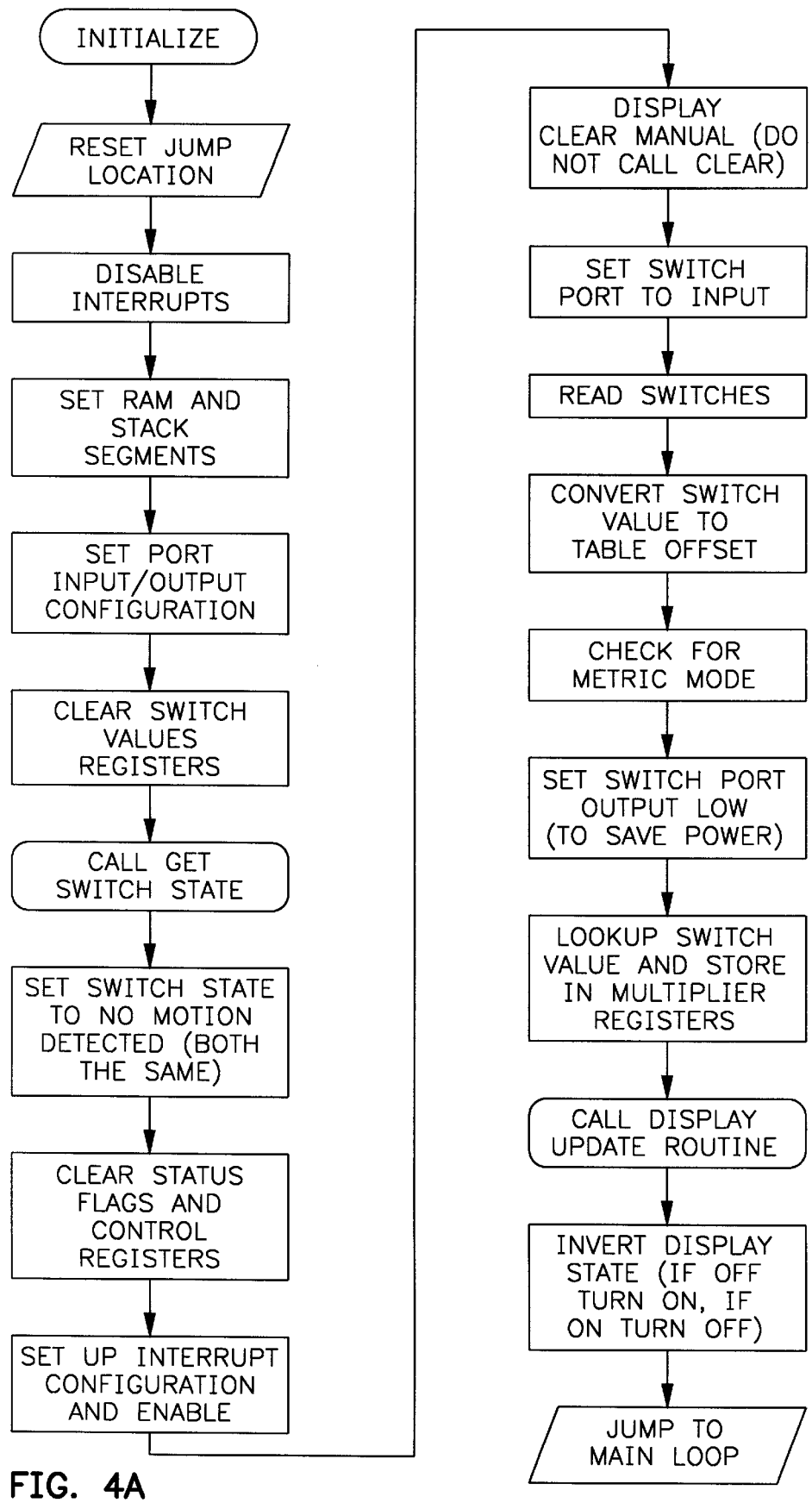
FIGS. 4A through 4P collectively provide a flow diagram of the operations performed by the control circuit of FIG. 3.
Figure 4B:
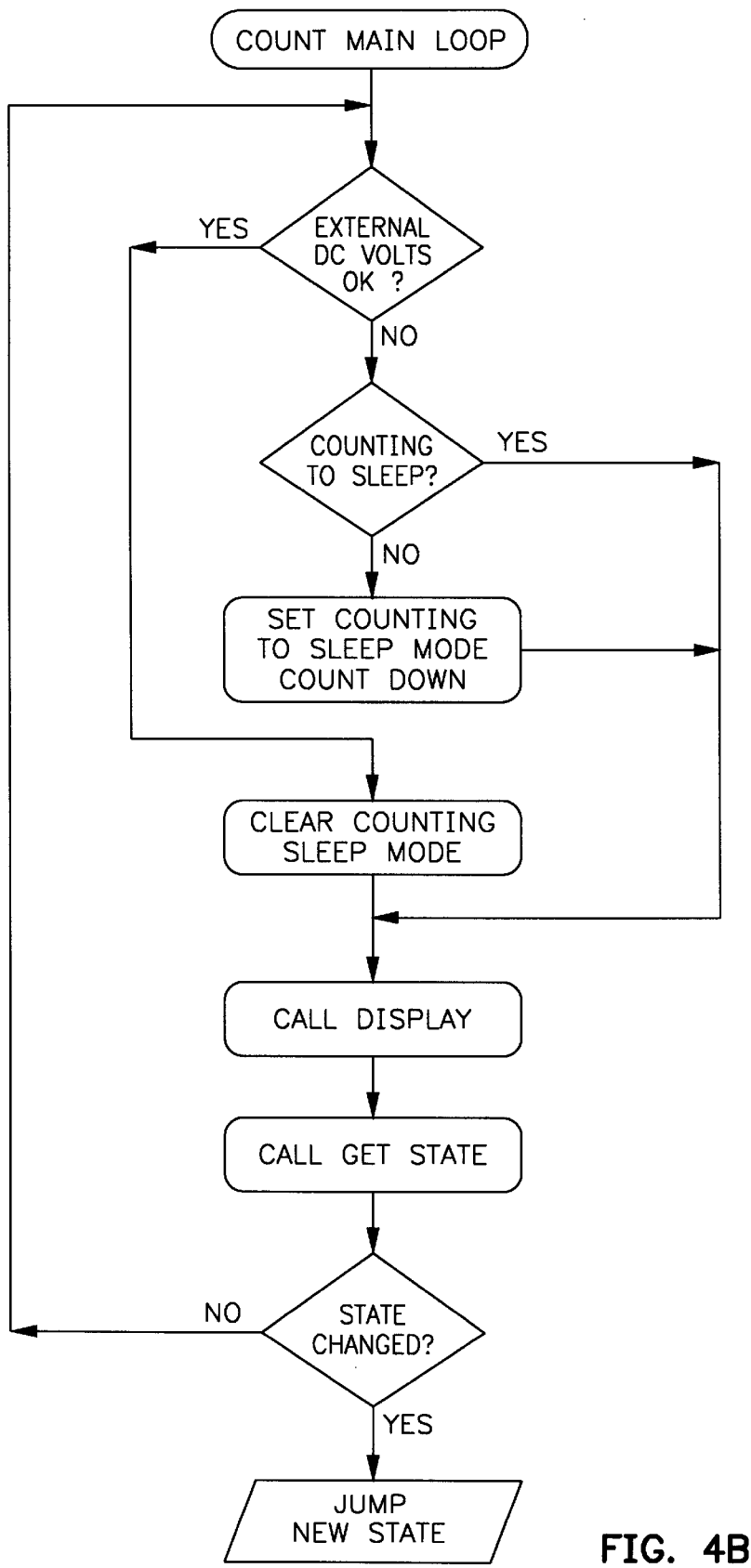
Figure 4C:
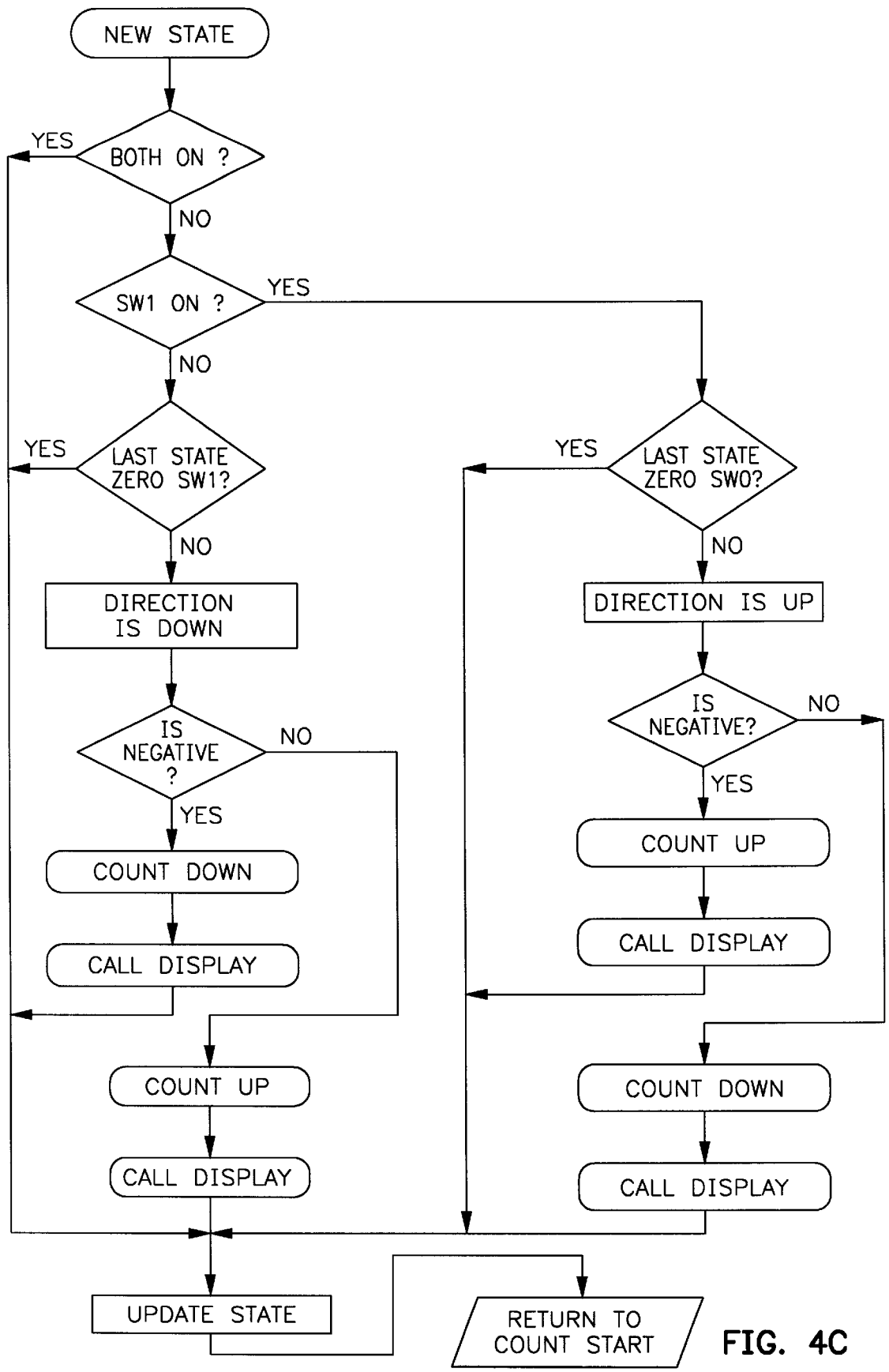
Figure 4D:
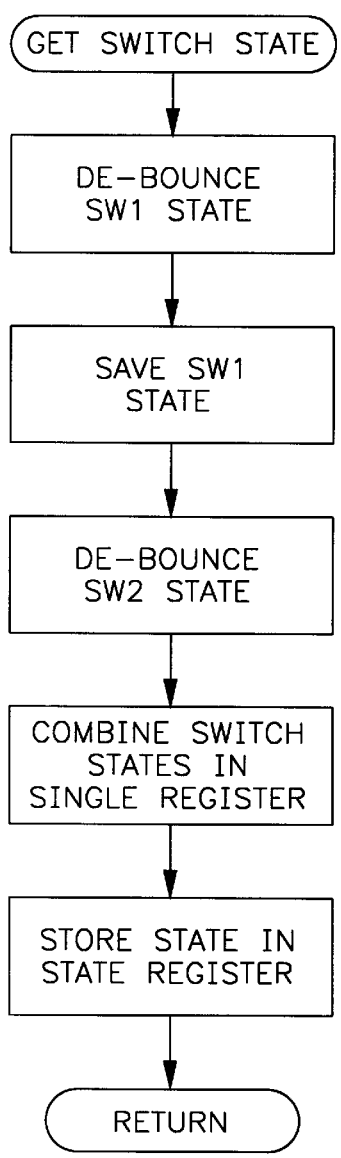
Figure 4E:
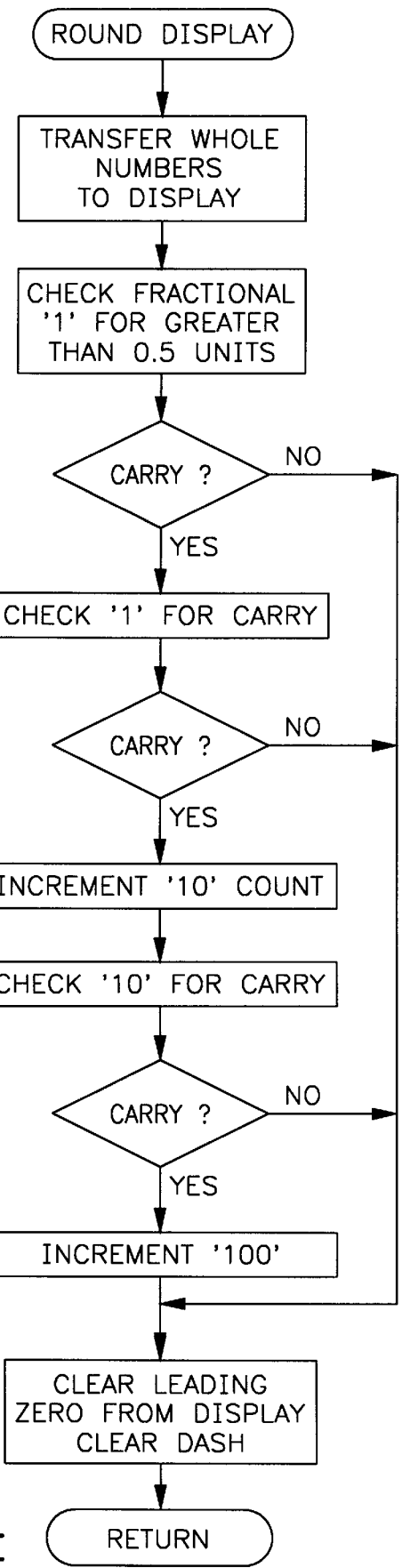
Figure 4F:
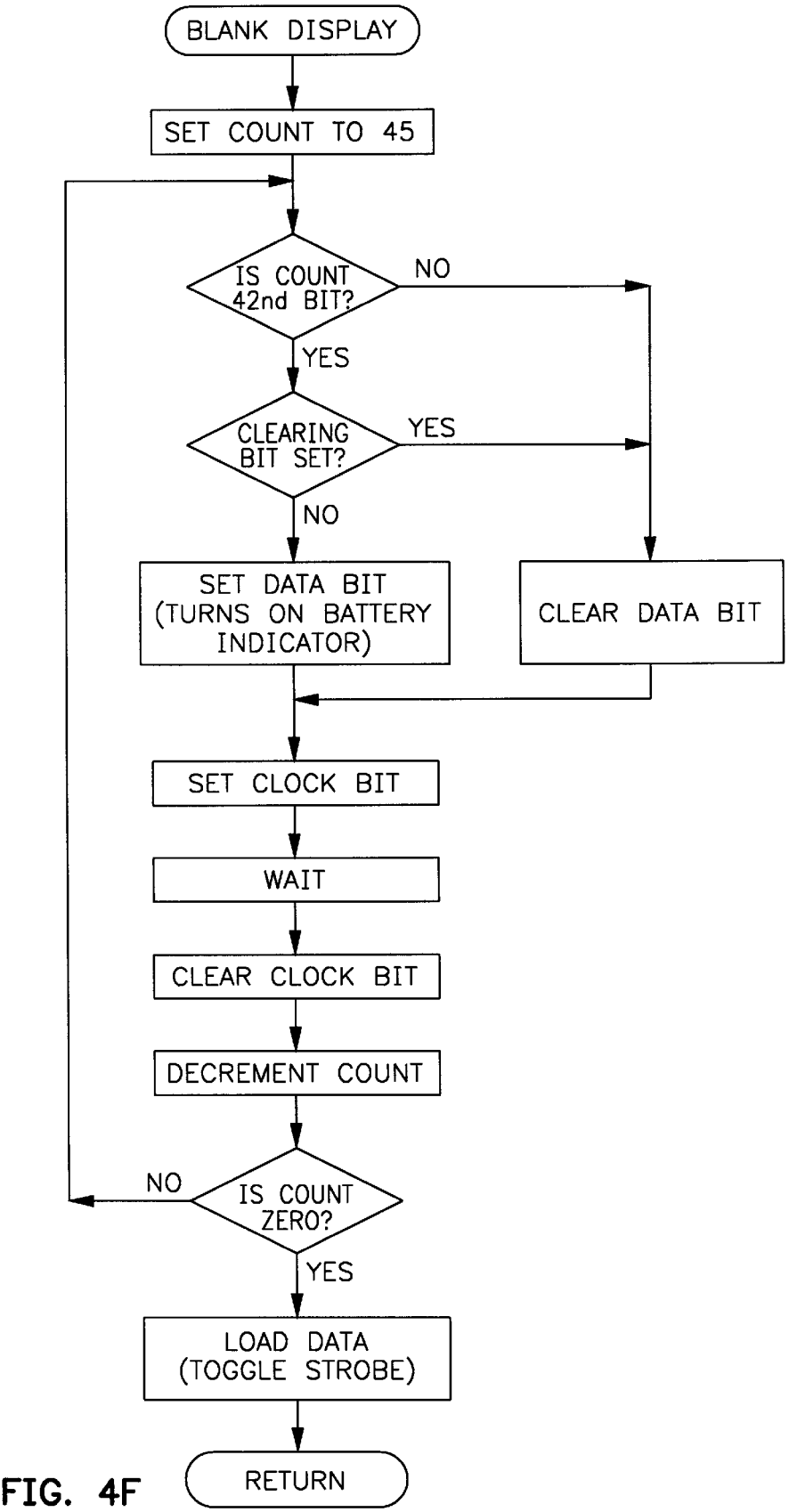
Figure 4G:
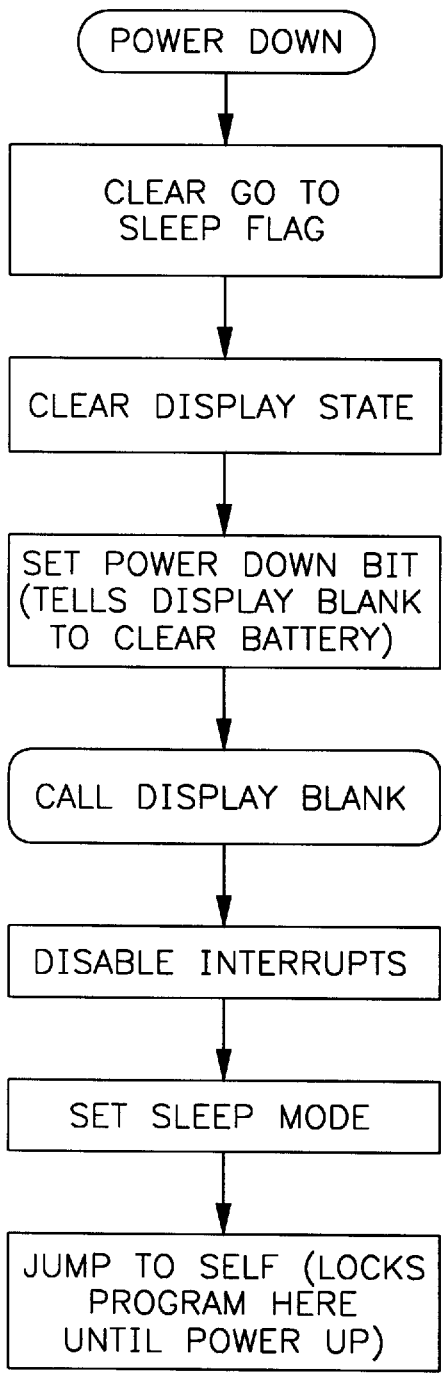
Figure 4H:
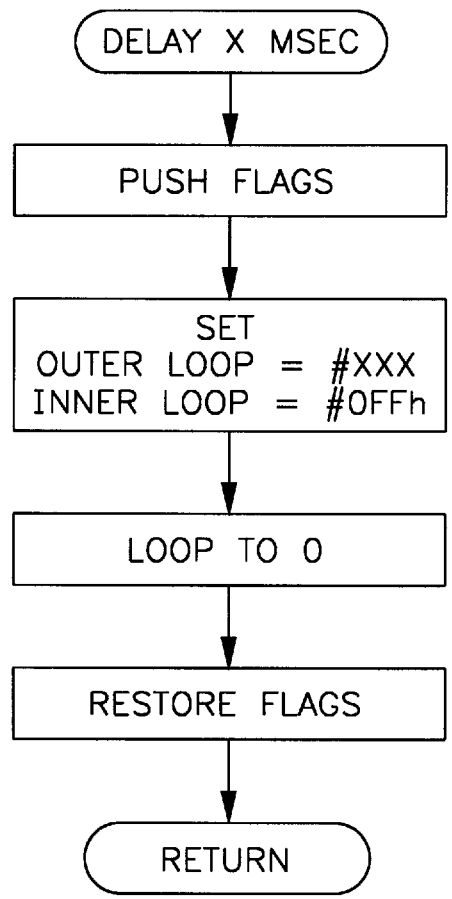
Figure 4I:
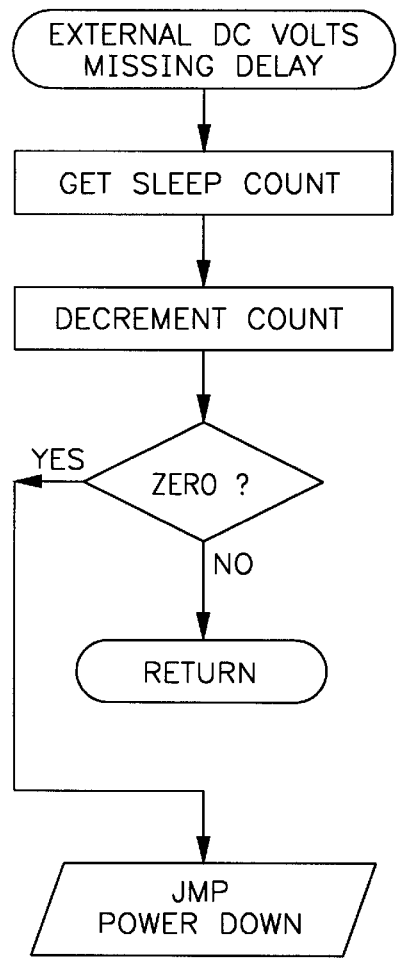
Figure 4K:
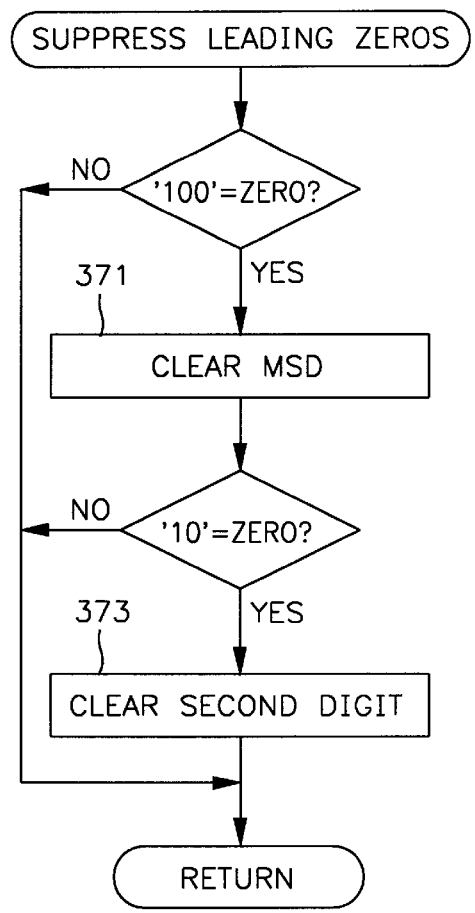
Figure 4J:
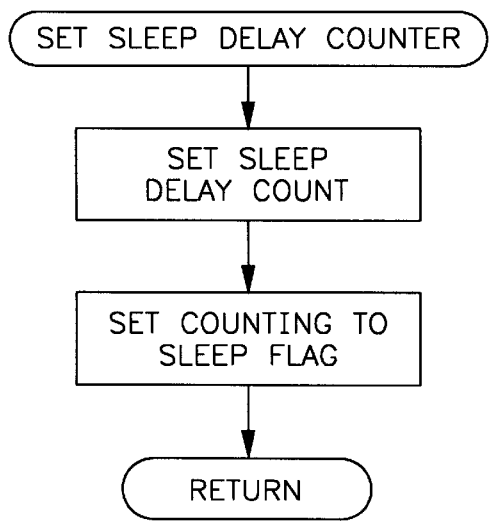
Figure 4L:
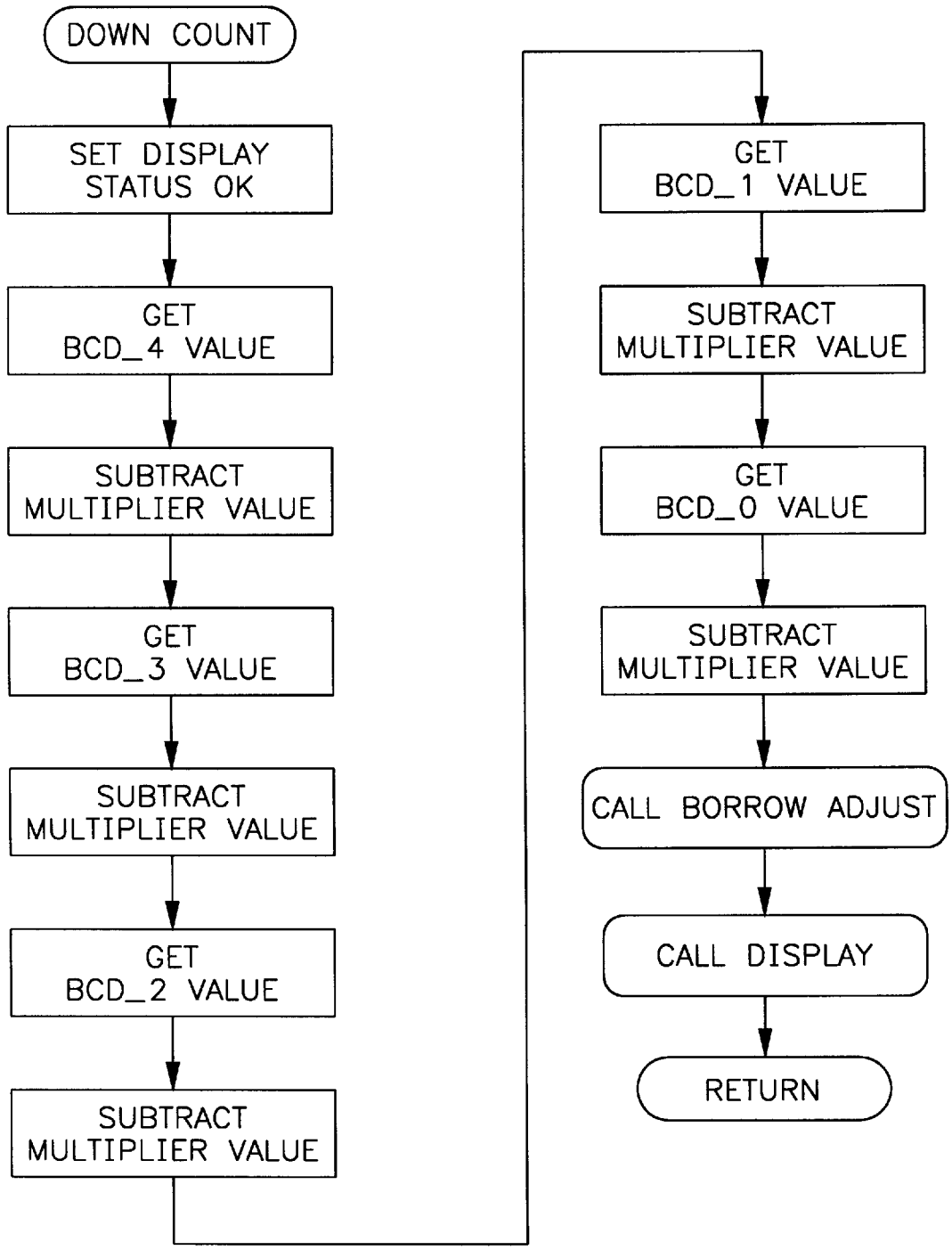
Figure 4M:
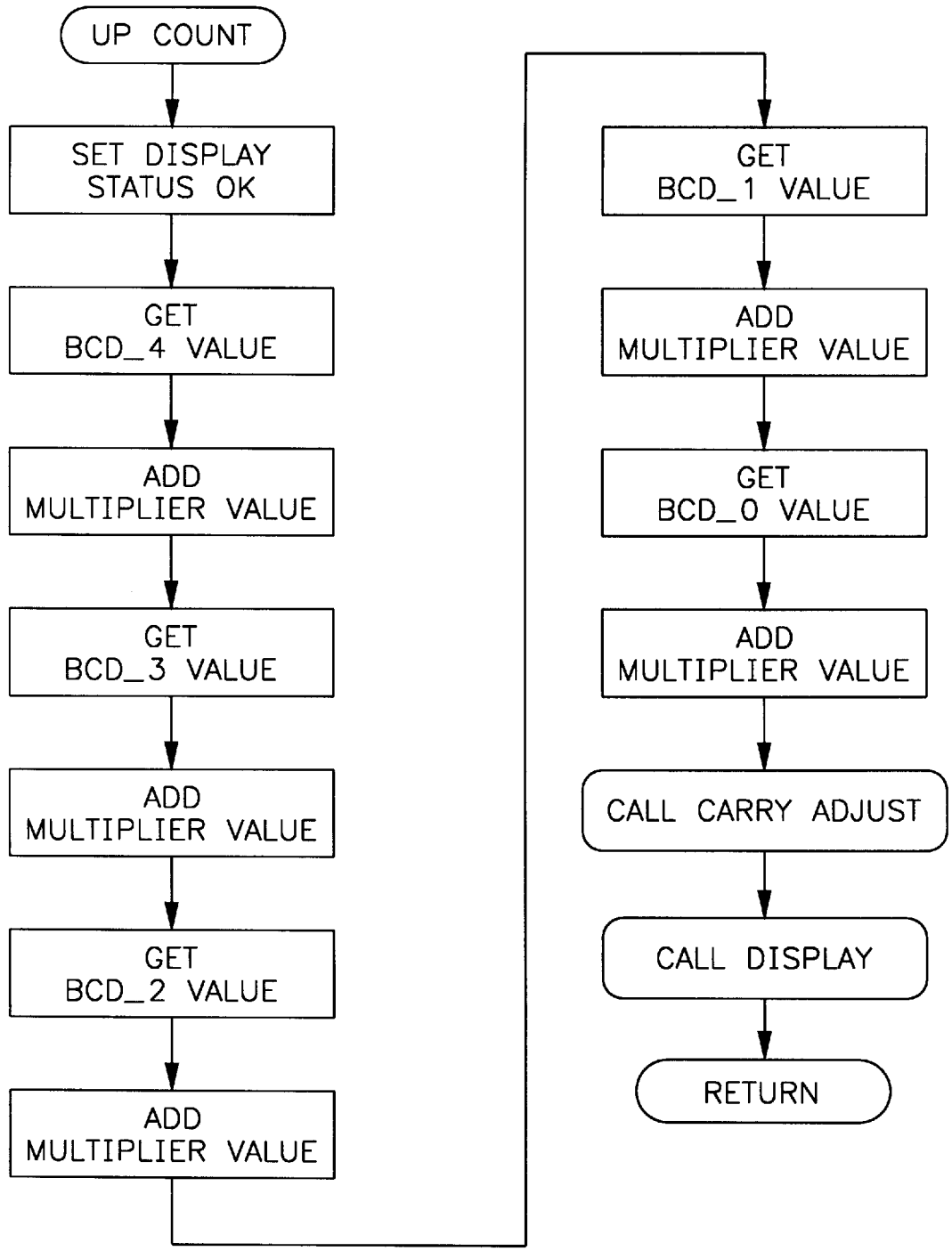
Figure 4N:
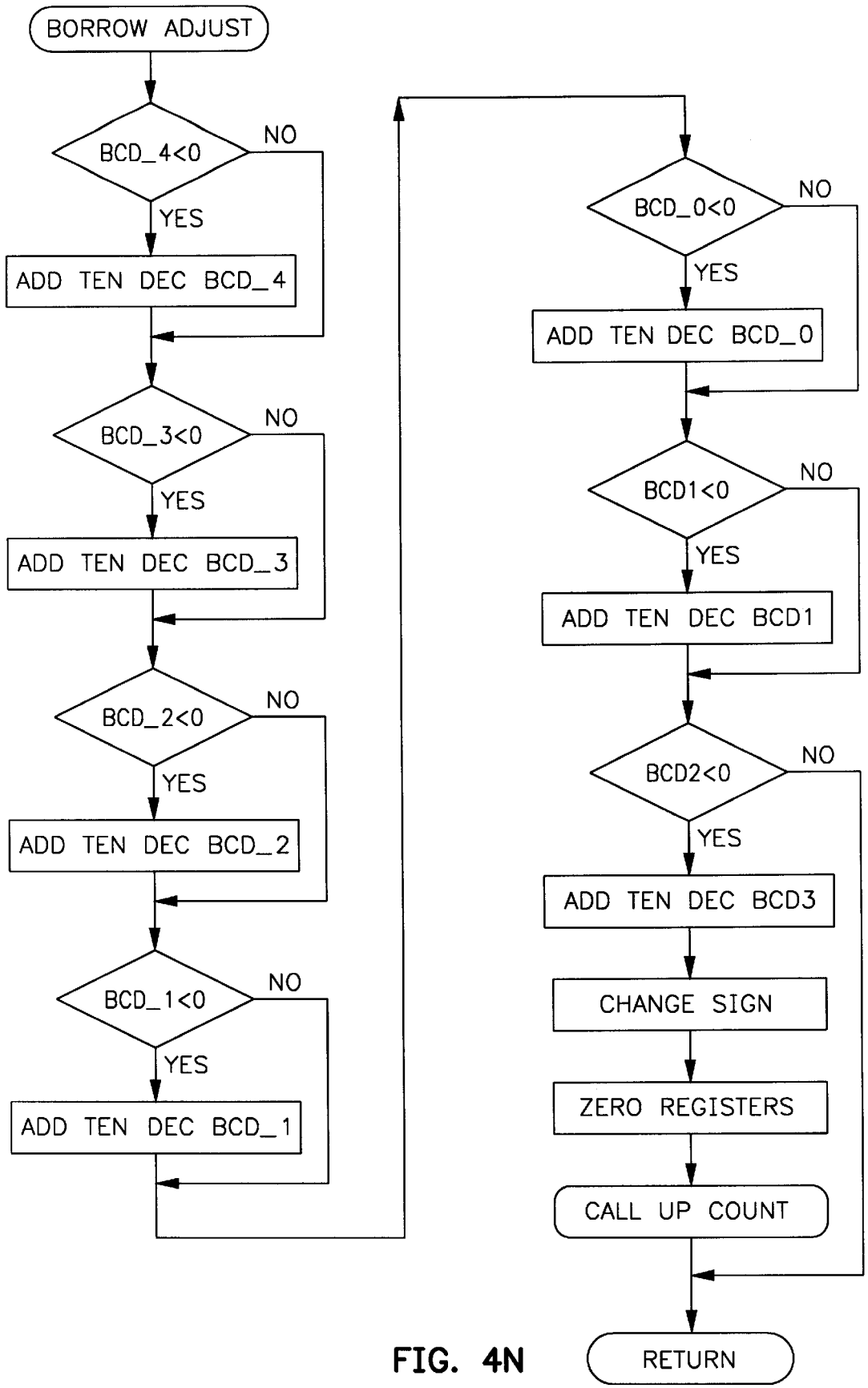
Figure 40:
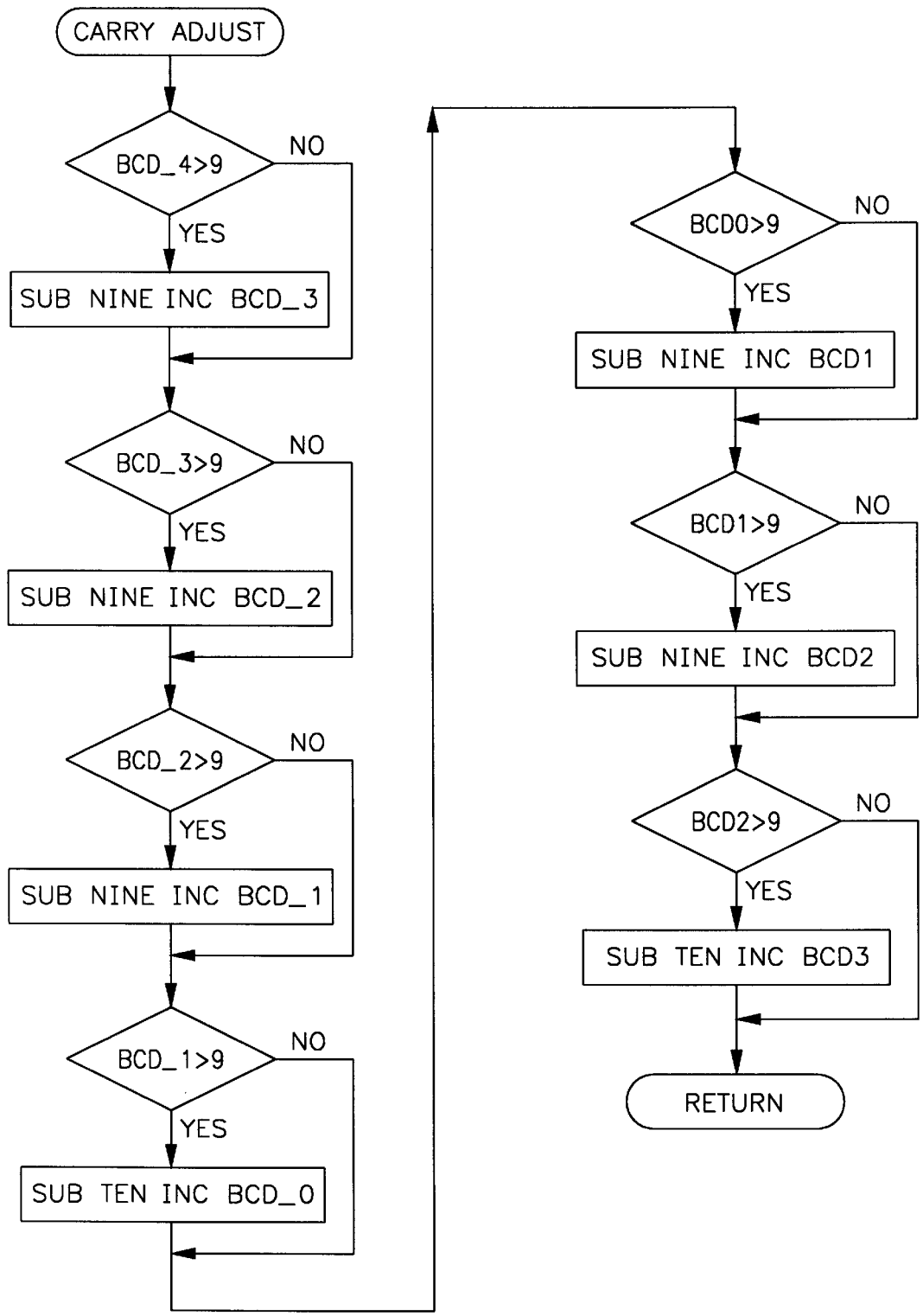
Figure 4P:
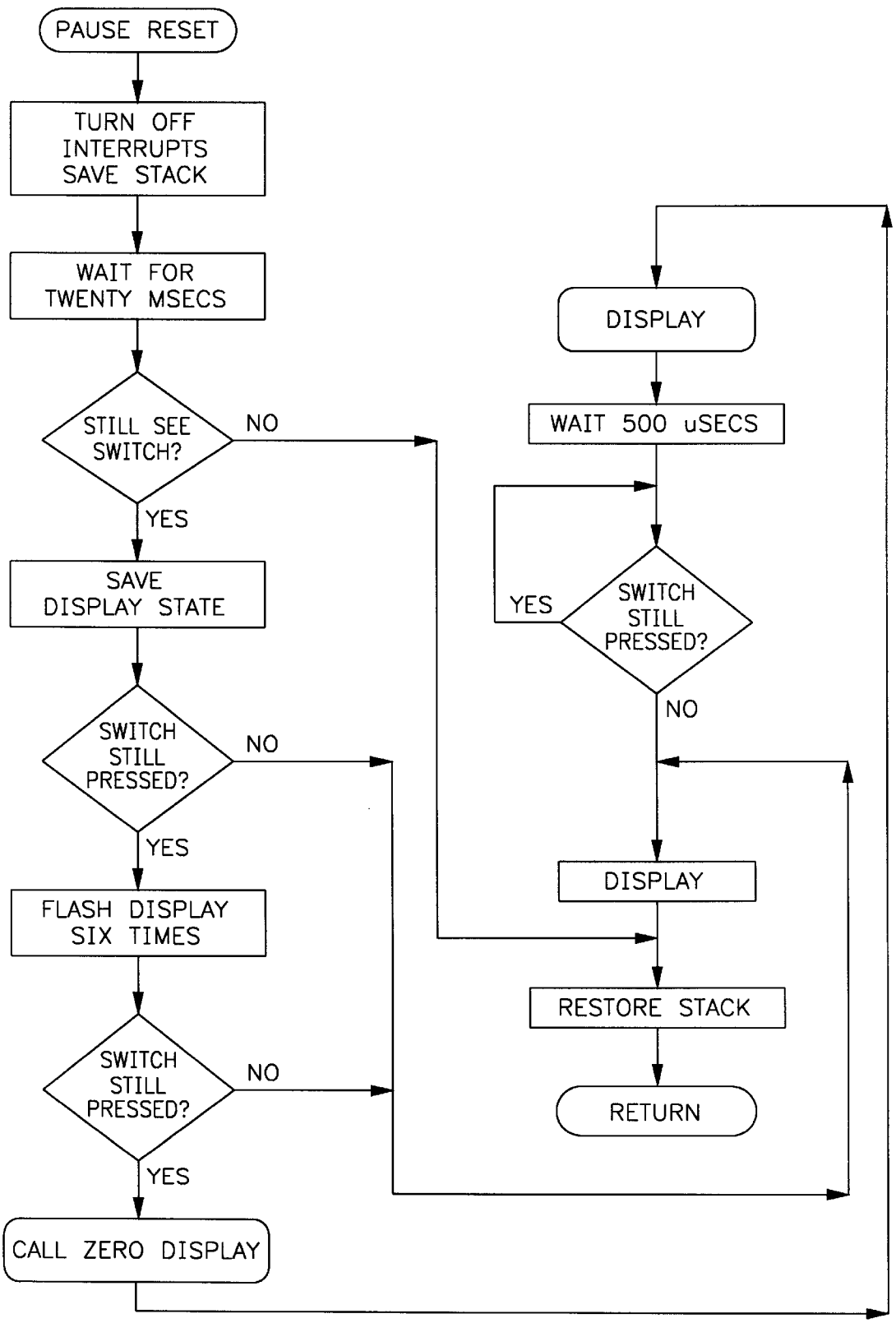

FIGS. 4A through 4P provide a flow diagram of the operations performed by the control circuit of FIG. 3. These operations are logically carried out by the CPU 56 of the microcontroller 54 utilizing a stored operation program in the ROM 60. In FIGS. 4A through 4P, the designation SW1 refers to the first reed switch and the designation SW2 refers to the second reed switch, of sensor assembly 42. Those skilled in the art of programming microcontrollers will understand the manner in which the logical operations set forth in the flow diagrams of FIGS. 4A through 4P accomplish the following functions and features of our system.

The control circuit 50 (FIG. 3) must have external DC power applied through the input/output connector 84 in order to operate. The backup battery 100 serves only to maintain in memory the count when the control circuit 50 is in its sleep mode, i.e. when the external DC power is no longer available. The control circuit 50 allows the count to be momentarily viewed when in this state. In order to be able to measure the passage of rode, the control circuit 50 must have external DC power ON.

The control circuit 50 does not have a power ON/OFF switch. It automatically receives DC power from an external source through the input/output connector 84 when that connector is connected to a live power supply such as the vessel's onboard power, or dockside power. Where the vessel or dockside power source is AC, it must be first converted into ten to thirty-five volts DC through a conventional rectifier circuit before being applied to the input/output connector 84 through a power cord, or other suitable wiring.

In cases where the control circuit 50 first comes ON and the external DC power source applied is slow to reach its operating voltage level, the control circuit 50 must be initialized before it can be used by the boatman. The boatman first pushes the ON/OFF switch 80 once or twice until a count is displayed, either zero or the last count saved in memory.

If the control circuit 50 has been powered up for the first time, or if it has been OFF for a long period of time, it is necessary to initialize the count. The boatman pushes the ON/OFF switch 80 for the display and then pushes the reset switch 82 until a count of zero is displayed. The control circuit 50 is now ready to count the anchor rode and to perform other functions. When the control circuit 50 detects pulses from the sensor assembly 42 indicating that the rode is being let out or drawn in, it counts the pulses and calculates the length of rode deployed in feet or meters, and determines the direction. As the count changes, the new count is indicated on the display 76. As rode goes out, the count goes up, and as the rode comes back in to the vessel, the count goes down. The count is only displayed in whole numbers, i.e. without any fractions, and will not change until at least one new pulse has been detected. Internally the control circuit 50 keeps track of fractional measurements, but rounds the same to the nearest whole number on the display. When the control system is configured for distance-between-pulses of less than a foot or a meter, the count will not change on the display 76 until at least half a foot or half a meter has accumulated. When the control circuit 50 has been configured for distance-between-pulses of greater than a foot or a meter, the count will sometimes jump several digits, depending on the accumulated value when the next pulse is detected.

While anchor rode is going out, that is the anchor is going down, the display 76 indicates a down arrow next to the count. While the anchor rode is coining in, that is the anchor is coming up, the display 76 shows an up arrow next to the count. When the control circuit 50 loses its external source of DC power, it will maintain the count in its sleep mode, but it will not maintain the direction of last movement. Therefore, when the control circuit 50 once again is connected to the external source of DC power, the count will reappear, but not the directional arrow. The arrow will reappear as soon as there is new motion of the rode.

A negative count, i.e., a count with a minus sign, will appear if the rode is made to come back in beyond the point at which it started, namely, the zero point or home position. In the case where the rode is out some distance and then the count is reset for some reason back to zero, the count will go negative and grow as the rode comes back in, instead of simply counting back down to zero as it normally would.

As indicated above, the sensor assembly 42 (FIG. 2) preferably has two reed switches mounted side-by-side for detecting the passage of the magnetic 28 on the rotatable element 30 of the winch 32. This arrangement allows the detection of the direction of rotation of the rotatable element 30 so that the microcontroller 54 can determine whether anchor rode is being let out of the vessel or drawn into the vessel. This is a very important feature of the present invention since it allows the boatman to adjust the anchor rode if the state of the seas should change after the original anchoring, requiring adjustment of the amount of anchor rode. Without the capability for detecting the direction of rotation of the rotatable element 30, the display would simply "add to the count" if the anchor rode were later drawn back into the vessel.

In order to detect the direction of rotation of the rotatable element 30 of the winch 32, our invention must accommodate the situation in which the rotatable element 30 stops when the magnetic 28 is immediately adjacent to one of the reed switches of the sensor assembly 42, or is between the two reed switches before resuming rotation in the opposite direction. The microcontroller 54 utilizes portions of the operation program stored in the ROM 60 to determine whether a valid pulse has been generated which is required in order to cause the rode count indicated on the display 76 to increase or decrease to the next value. A valid pulse can only be produced by a specific state sequence. The opto-isolator circuit 86 is utilized in conjunction with contact-debounce algorithms of the operation program to pre-qualify signals from the state machine. The microprocessor 54 must first detect a reed switch contact closure from a first one of the reed switches only, then from both of the reed switches simultaneously, and finally from the second reed switch only. This sequence of reed switch contact closures indicates a valid pulse, and can occur when the rotatable element 30 of the winch 32 is rotating in either direction. FIGS. 4C and 4D relate to the detection of the contact closure of the two different reed switches which are referred to as SW1 and SW2. The reed switches SW1 and SW2 are mounted and wired such that reed switch SW1 is the first sensor encountered by the magnetic 28 when the rotatable element 30 of the winch 32 is turning in the "first" direction, i.e. paying out anchor rode. The second reed switch SW2 is thus encountered and acted upon by the magnetic 28 as the rotatable element continues to rotate in the first direction. A valid pulse is indicated by the sequence of contact closures of the reed switches SW1 and SW2 as indicated above, and in the aforementioned flow diagrams.

The display 76 does not have to be activated indicating the count in order for the control circuit 50 to detect new pulses and begin counting again. Instead, the display 76 can display other information, such as an icon indicating that a trickle-charge is in process. In such a case, the control circuit 50 will automatically start displaying the count again when it detects new rode movement. The control circuit 50 must, however, have external DC power applied to be able to perform its counting function. In other words, when the control circuit 50 is in its sleep mode, it cannot count the anchor rode coming in or out of the vessel.

The display switch 80 has three functions. First, it can be used to initialize the control circuit 50 after it has just had the external source of DC power applied. Second, it is utilized to turn the display 76 ON and OFF. When the display 76 is ON, the count is indicated on the display 76. When the display 76 is turned OFF, by pressing the switch 80, the battery icon is indicated on the display 76. This tells the boatman that the system has power and is trickle charging the backup battery 100. The display 76 can be left ON or OFF as the boatman prefers, but in either state, the battery charge circuit 98 still supplies a trickle charge to the backup battery 100. The third function of the switch 80 is available when the control circuit 50 does not have an external source of DC power applied and is therefore in its sleep mode utilizing power from the backup battery 100 to maintain the count in memory. In this condition, pushing the switch 80 will cause the count to be indicated on the display 76 in momentary fashion. In other words, the boatman can press the switch 80 in order to see the count when the control circuit 50 is in its sleep mode, and when the switch 80 is released, the display 76 will go OFF again.

If the display 76 is blank, this is either because the control circuit 50 has the external source of DC power applied, but the control circuit 50 has not yet been initialized by pressing on the ON/OFF switch 80, or the control circuit 50 has no external DC power applied and is currently in a sleep mode. When the control circuit 50 has no external source of DC power applied, and pressing the pushbutton switch 80 does not result in the display of a count, then the backup battery 100 needs charging. In this condition, the memory of the microcontroller no longer stores the current count.

The reset switch 82 (FIG. 3) is used to clear or reset the count to zero. If the control circuit 50 is being used for the first time, the reset button 82 is pressed to initialize the count. When the boatman presses and holds the reset switch 82, the current anchor count is displayed on the display 76 which blinks ON and OFF for a few seconds, as a warning that the count is about to reset to zero. If the boatman releases the pushbutton switch 82 before the count changes to zero, the count will remain as it was. When the count changes to zero, the display 76 stops blinking to let the boatman know that the reset pushbutton switch 82 has completed its function. Thereafter, when the boatman releases the pushbutton switch 82, the display 76 reverts to its previous state. The previous state of the display 76 could be either an indication of the current count or an indication of the battery icon. When the control circuit 50 is in its sleep mode and operating under the power of the backup battery 100 only, the functionality of the reset switch 82 is deactivated.

The anchor UP/DOWN switch 88 (FIG. 3) is preferably a spring-centered toggle switch which is used to control the winch 32 for raising and lowering the anchor. When the boatman pushes up on the switch 88, the control circuit 50 will send motor direction control signals through the relay board 52 to the motor control circuit 33 to raise the anchor, i.e., pull the rode in. When the boatman pushes down on the spring-centered toggle switch 88, motor direction control signals will be sent through the relay board 52 to the motor control circuit 33 to lower the anchor, i.e., play rode out. When the boatman releases the spring-centered switch 88, it automatically returns to its center OFF position. An advantageous feature of the control circuit 50 is that the external source of DC power need not be ON in order for the anchor UP/DOWN switch 88 to be functional. It can still be toggled to raise and lower the anchor, however, the control circuit 50 will not be able to count the rode unless the external source of DC power is applied to the control circuit 50 through the input/output connector 84.

Pressing the pushbutton switch 78 turns the backlighting of the LCD display 76 ON and OFF. If the control circuit 50 is in its sleep mode, the backlight of the LCD display 76 is automatically switched to its OFF state. When the circuit 50 is in its sleep mode, the functionality of the back light ON/OFF switch 78 is deactivated.

While we have described a preferred embodiment of our system and method for monitoring and controlling anchor rode length, it should be apparent to those skilled in the art that our system may be modified in both arrangement and detail. For example, the sensor assembly could have a single reed switch in which case the amount of rotation, but not the direction, would be detected. The sensor assembly could include an optical sensor that would detect an optical marking or markings on the rotatable element of the winch. The sensor assembly could thus be configured to detect rotation of the rotatable element with various alternative indicators on the rotatable winch in lieu of the magnet 28. Any number or combination of panel mounted and handheld control circuits can be used on the same vessel. They may be all connected to the same sensor assembly so that the units will all work in unison. These multiple control circuits are connected to each other through the input/output connector 84 of each control circuit which acts as an interface. Therefore, when a reset of the count is performed at one control circuit, all of the other connected control circuits will also be reset. Multiple control circuits can count and display the anchor rode simultaneously, as they each deteact and process the signals from the same sensor assembly 42. Therefore, in view of the various modifications to our invention that will occur to those skilled in the art, the protection afforded the same should only be limited in accordance with the following claims.

What is claimed is:

1. A system for monitoring and controlling anchor rode length, comprising:
    a winch mountable on a vessel and having a rotatable element about which an anchor rode is at least partially wrapped and energizable to rotate the rotatable element in a first direction for letting out the anchor rode from the vessel and energizable to rotate the rotatable element in a second direction for pulling the anchor rode into the vessel;
    a sensor assembly mounted adjacent the rotatable element for generating signals representative of the amount of rotation of the rotatable element; and
    a control circuit connected to the winch and the sensor assembly that selectively energizes the winch upon receipt of a plurality of predetermined commands for rotating the rotatable element in the first and second directions to control a length of anchor rode deployed from the winch using the signals from the sensor assembly.

2. The system of claim 1 wherein the control circuit includes a display for indicating the amount of anchor rode deployed from the winch.

3. The system of claim 1 wherein the sensor assembly includes at least one reed switch for detecting the passage thereby of a magnet affixed to a periphery of the rotatable element.

4. The system of claim 1 and further comprising a battery connected to the control circuit for powering the control circuit in the event of a failure of an external source of power in order to maintain a recorded signal representing the length of anchor rode deployed from the winch.

5. The system of claim 4 wherein the control circuit is configured to operate in a sleep mode in the event of a failure of the external source of power for conserving a level of power stored in the battery.

6. The system of claim 1 wherein the sensor assembly generates signals representative of both the amount and direction of rotation of the rotatable element.

7. The system of claim 6 wherein the sensor assembly includes a pair of reed switches for detecting the passage thereof of a magnet affixed to a periphery of the rotatable element.

8. The system of claim 1 wherein the control circuit includes a connector for providing an interface to a similar control circuit connected to the sensor assembly.

9. The system of claim 6 wherein the control circuit includes a display for indicating both the amount of anchor rode deployed from the winch and the direction of rotation of the winch.

10. The system of claim 1 and further comprising a relay board for communicating a plurality of motor direction control signals from the control circuit to a motor control circuit of the winch.

11. A method of monitoring and controlling anchor rode length, comprising the steps of:
    mounting a winch on a vessel, the winch having a rotatable element about which an anchor rode is at least partially wrapped, the winch being energizable to rotate the rotatable element in a first direction for letting out the anchor rode from the vessel and energizable to rotate to rotatable element in a second direction for pulling the anchor rode into the vessel;
    wrapping a length of anchor rode at least partially around the rotatable element, the anchor rode being connected to an anchor;
    providing an indicator on a periphery of the rotatable element of the winch;
    positioning a sensor assembly adjacent the rotatable element of the winch for detecting the passage thereby of the indicator and for generating signals representative of the amount of rotation of the rotatable element of the winch;
    providing a first command to the winch for causing its rotatable element to rotate in the first direction;
    providing a second command to the winch for causing its rotatable element to rotate in a second direction;
    determining the amount of anchor rode deployed from the winch utilizing the signals from the sensor assembly; and indicating to a boatman the amount of anchor rode deployed from the winch.

12. The method of claim 11 wherein the sensor assembly also generates signals representative of the direction of rotation of the rotatable element and further comprising the step of indicating to the boatman the direction of rotation of the rotatable element, in addition to the amount of anchor rode deployed from the winch.

13. The method of claim 11 and further comprising the step of maintaining a record of the amount of anchor rode deployed from the winch in the event of a failure of an external source of power.

14. The method of claim 11 wherein the indicator is a magnet affixed to a periphery of the rotatable element.

15. The method of claim 14 wherein the sensor assembly includes a pair of reed switches for detecting both the amount and direction of rotation of the rotatable element.

16. The method of claim 12 wherein the sensor assembly includes a first switch and a second switch spaced apart around a circumference of the rotatable element of the winch and the method further comprises the step of detecting the closure of a first one of the switches followed by the subsequent closure of the second one of the switches before changing a count of the amount of anchor rode indicated to the boatman.

* * * * *